Feb. 21, 1967  L. B. CAYOT  3,304,930
WALL FURNACE CONSTRUCTION
Filed March 22, 1965  3 Sheets-Sheet 1
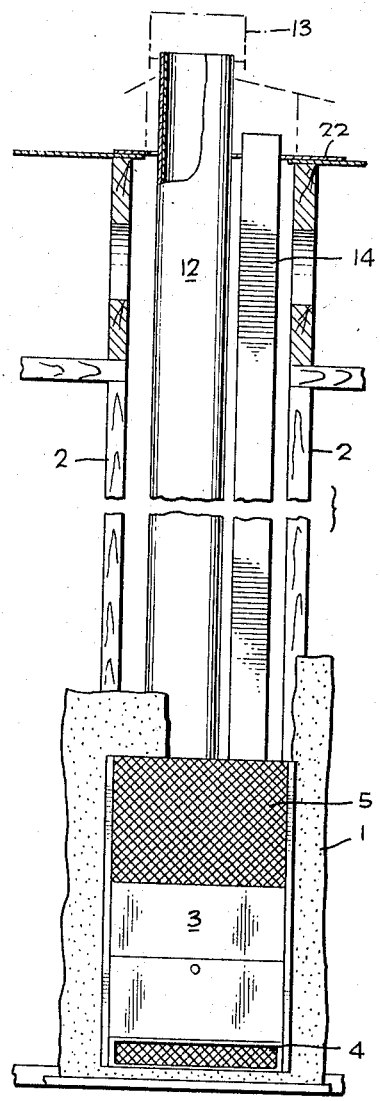
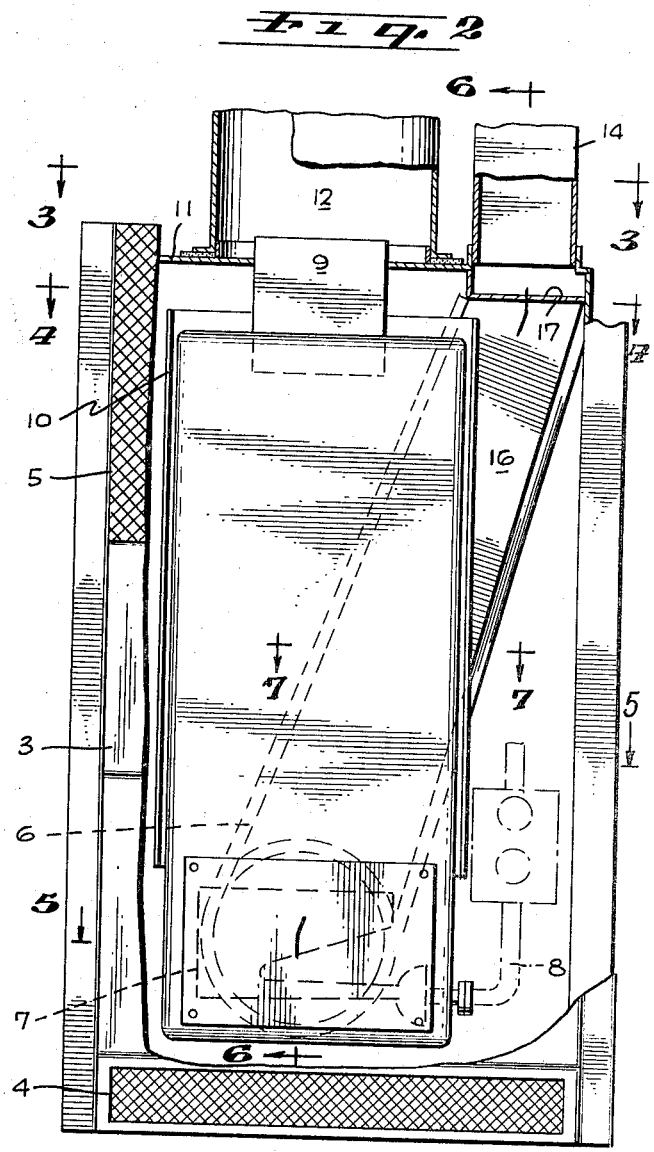
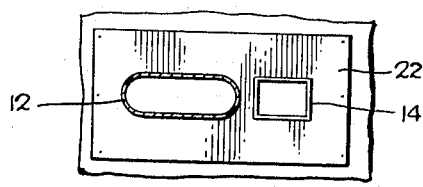
Lynn B. Cayot
INVENTOR.
BY
ATTORNEY Feb. 21, 1967  L. B. CAYOT  3,304,930
WALL FURNACE CONSTRUCTION
Filed March 22, 1965  3 Sheets-Sheet 2
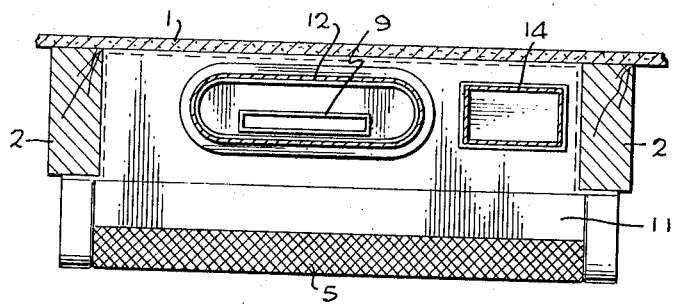
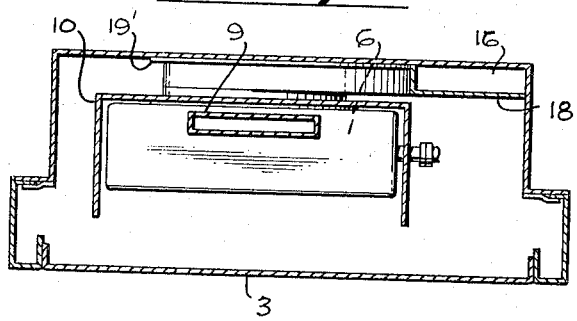
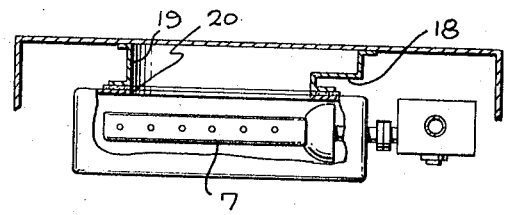
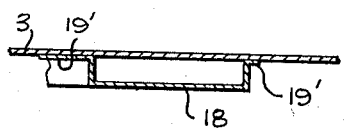
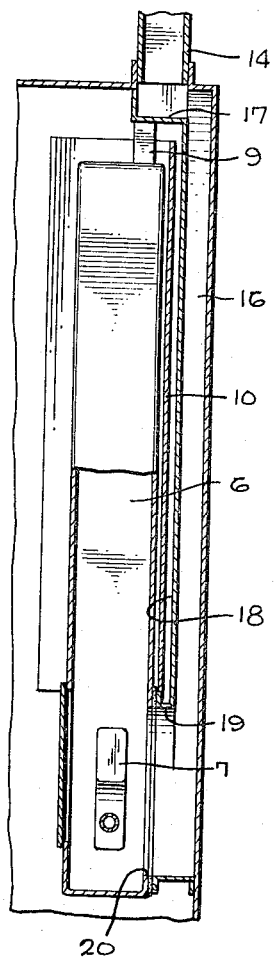
LYNN B. CAYOT
INVENTOR.
BY Philip Subkow
ATTORNEY Feb. 21, 1967 L. B. CAYOT 3,304,930
WALL FURNACE CONSTRUCTION
Filed March 22, 1965 3 Sheets-Sheet 3
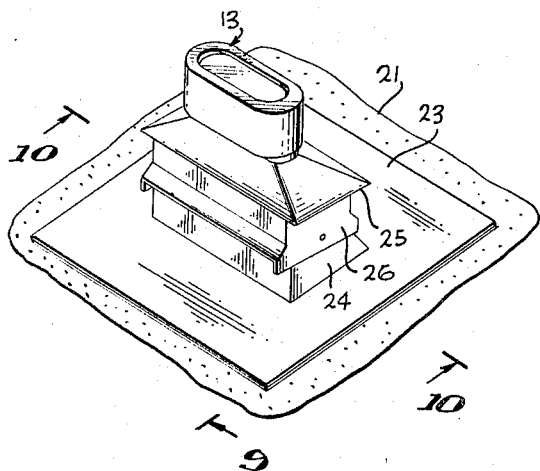
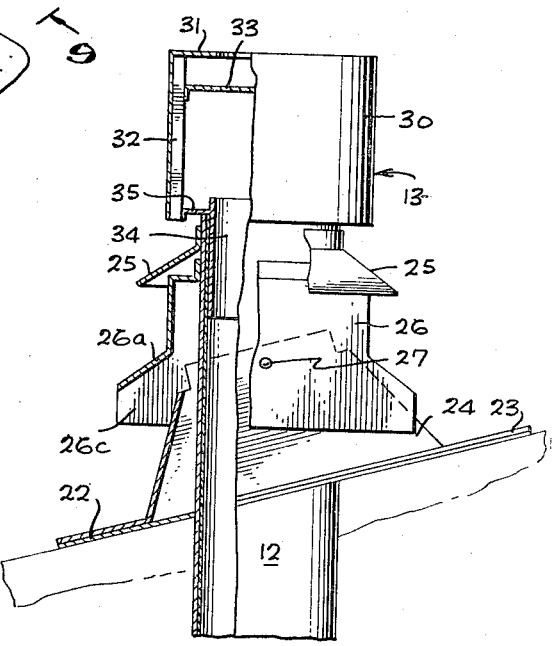
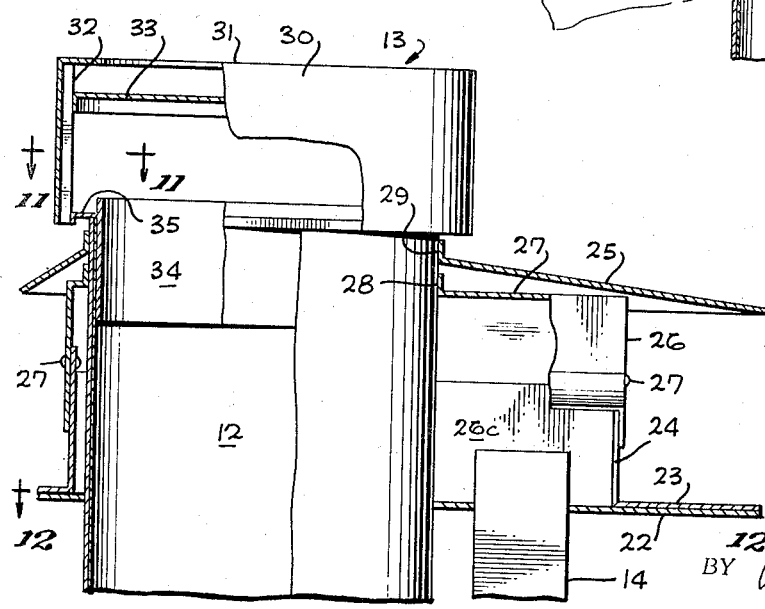
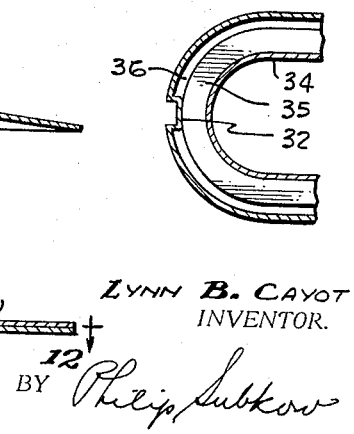
LYNN B. CAYOT
INVENTOR.
BY Philip Subkow
ATTORNEY

United States Patent Office 3,304,930
Patented Feb. 21, 1967

3,304,930
WALL FURNACE CONSTRUCTION
Lynn B. Cayot, 2127 W. Commonwealth Ave.,
Alhambra, Calif. 91803
Filed Mar. 22, 1965, Ser. No. 443,778
2 Claims. (Cl. 126—116)

This invention relates to and has for its object a wall heater having a flue which is vented to the external ambient atmosphere, external of the space being heated by the wall heater.

The discharge of the flue gas is preferably at a vertical height remote from the fire box of the heater, and the combustion air inlet to the fire box is also taken from the ambient air external of the space being heated, and at a vertical height remote from the fire box. The fire box air conduit and combustion gas conduits form a sealed thermosyphonic circulating system which is sealed from the external environment except that the inlet and outlet at the flue and the air conduits at a place external of the space being heated. The flue gas conduit combustion space and inlet air conduits form a U-tube, and the air circulation rate will be a function of the difference in density of the combustion gases and inlet air and of the combustible gas feed rate.

By positioning the air intake and flue gas discharge in the external environment, as for example, through the roof of the building in which the space heater is located, the external environmental air and wind pressure at the air intake and the flue gas discharge are equalized and nullified. Under some conditions, wind may cause damage to any vent shield and result in downdraft which could extinguish the flame. Furthermore, since the system is a closed system, the accumulation of combustible gas, or the accumulation of combustion gases cannot escape into the space being heated.

By positioning the air inlet at the roof instead of at the floor within the space being heated, I avoid a difficulty resulting from the provision of a gas passage either through the floor or into the space being heated. Where the discharge is through the floor, a difficulty arises more apparent when the heater is used in house trailers, that the basement may become sealed, as for example, by a foundation for the house trailer. The air space underneath the floor will not be a suitable source for combustion air. Furthermore, the air pressure at the flue gas vent may become in excess of that in the basement, for example, in a wind storm, and blow out the burner and this may result in the accumulation of combustible gas in a sealed space underneath the floor.

In the preferred embodiment of my invention, I position both the flue and the air inlet conduits to extend upwardly side by side. They may both be enclosed in the wall between studs when installed in the walls. The flue and air intake conduits are separated from each other and the flue conduit may be insulated from the air conduit so that the heat transfer from the flue to the air conduit is minimized. In this manner, the draft is not impaired and the gas velocities in the air and flue conduits may be maintained at the desired rate.

These difficulties are avoided and advantages are obtained by the use of the air circulation flue gas venting system of my invention, which will be more fully described by reference to the drawings of which:

FIG. 1 is a vertical plan view of the furnace installed in a wall shown in sections;
FIG. 2 is a front elevation view of FIG. 1 with parts partly in section and partly broken away;
FIG. 3 is a section taken on line 3—3 of FIG. 2;
FIG. 4 is a section taken on line 4—4 of FIG. 2;
FIG. 5 is a section taken on line 5—5 of FIG. 2;
FIG. 6 is a section taken on line 6—6 of FIG. 2;
FIG. 7 is a section taken on line 7—7 of FIG. 2;
FIG. 8 is a perspective view of the cap structure;
FIG. 9 is a view on line 9—9 of FIG. 8 with parts broken away and parts in section;
FIG. 10 is a view on line 10—10 of FIG. 8 with parts broken away and parts in section;
FIG. 11 is a fragmentary section on line 11—11 of FIG. 10; and
FIG. 12 is a section on line 12—12 of FIG. 10.

The furnace construction and combustion gas flue discharge are essentially such as have been used in the prior art, and no particular novelty is claimed for the construction apart from its use with the air intake and combustion gas discharge conduits and associated parts to form the novel combination of my invention generally described above.

Modifications of the construction of the system of the prior art, to accommodate the novel air intake, will be more fully described below. Any form of wall heater may be inserted in the wall 1, between studs 2. The various conformations of baffles and casings are employed, and I have merely illustrated one form to indicate a wall heater, which is provided with a vertical discharge and vertical air intake.

For the purposes of my invention, the wall heater combustion box and flue is made into a sealed combustion box with connections to the upwardly extending air intake and flue in contradistinction with the conventional vented combustion boxes.

Referring to FIGS. 1 and 2, the wall heater has a housing 3, with a bottom and louvered front openings 4 and 5. The flue 6 has a closed bottom. The burner 7 is positioned at the lower end of the flue conduit 6 and is connected to the combustible gas conduit 8, suitably sealed against gas leakage. A baffle 10 is positioned in the case 3. The combustion gases discharge through the flue conduit 6 and pass into a short vent pipe 9 connected to the flue conduit 6. The vent pipe 9 is positioned in the header 11 which forms the top of the furnace housing 3, and is mounted on a header 11 with a substantially gas type connection, as is the main vent pipe 12. Thus, no combustion gases can discharge into the case 3, or through the louvered openings 5.

The flue gas conduit extends upwardly, for example, vertically from the header 11, to and through the roof of the building, and is covered by a cap 13 shown schematically. For example, the cap may be that described in my Patent 3,017,878, modified to receive the conduit 14; or conduit 14 may be provided with a separate cap. I prefer to employ the vent cap shown in FIGS. 8 through 11, to be described below.

The air intake for combustion is through a conduit 14 terminating above the roof, adjacent the position of the vent pipe 12. It terminates at a level somewhat lower than the level of the terminal end of the vent pipe, but is horizontally closely adjacent to the point of discharge of the flue gases to ambient atmosphere. The conduit 14 terminates within cap 13, described below. The conduit 12 may be exteriorly suitably insulated, such as with asbestos or any other insulation used in the furace art.

The air conduit 14 may be cylindrical, oval, or square in cross-section, as may also be the vent pipe 12, as shown.

The conduit 16 is connected to the conduit 14, as shown in FIGS. 2, 4 and 6. The conduit 16 is angularly disposed in the form of an angularly extending conduit which connects the conduit 14 with the circular opening 19, at the lower end of the flue 6 and adjacent the burner (see FIGS. 5 and 6).

At the entrance to the angularly disposed conduit 16, where it connects to the air conduit 14, is a baffle 17 forming the bottom of the conduit 14, and directing the inlet air from the inlet conduit 14 into the angular air conduit 16.

The angular air conduit 16 is formed of a channel member 18, having side flanges 19′ secured to the interior back wall of the case 3, to form with the case an air-tight conduit connected to conduit 14 and with the combustion space in the flue conduit 6. It acts also as a reinforcing and stiffening member for said housing. The lower end of the conduit 16 is connected to the cylindrical conduit 19, which in turn is connected to the air intake opening 20 of the combustion space adjacent the burner (see FIGS. 2, 4 and 5). The baffle 10 is suitably secured to the case, as is conventional for such baffle, so that its lower end is above the combustion space air inlet conduit 19. The usual supporting members, such as are conventionally used for flues, may also be used.

The above structure thus forms a gas tight combustion space adjacent the opening 20 and open at the air inlet through 16, 19 and 20, and vented to ambient through 12.

While conventional caps for pipes extending through the roofs, as referred to above, may be used if space is available, the proximity of the flue gas conduit and the air intake conduit, even though spacially separated, introduces limitations on the size and arrangement of the caps. Additionally, special provision may need to be made to support the conduits at the roof line. This is complicated by the pitch of the roof, particularly if it is steeply angled.

The cap shown in FIGS. 8 through 11 permits not only the support of the conduit at the roof line, but also permits of the separation of the ends of the conduits so that the draft is not influenced in a material sense, nor does the draft affect the intake in a substantial way. The cap will also protect the air intake and flue discharge from weather and from the effect of wind velocity and wind pressure.

Additionally advantage is that the cap may be used on flat or pitched roofs.

As shown in FIGS. 8 through 12, the plate 22, positioned on the roof 21, is provided with apertures through which conduits 12 and 14 pass. The plate thus holds the top of the conduits 12 and 14 secure to the roof. The plate 23 is positioned on the plate 22. The upright rectangular housing 24 is connected at its end to the plate 23. The canopy 25 is mounted on the upper end of the conduit 12. A downwardly depending member 26 is also mounted on the upper end of conduit 12 and is pivotally mounted at its lower end on the pivot pins 27 in the housing 24. The rectangular member 26 has a top 27 provided with an opening 28 through which the conduit 12 projects and makes a snug sliding fit. The depending member 26 has vertical walls at each end on which it is pivoted on the pivots 27, and the other sides 26a are bent at an obtuse angle and terminate at an elevation above the ends of the vertical sides providing an opening 26c along the sides of the member 26. The vertical walls are spaced horizontally from the conduit 12 and the cap housing 24. The canopy 25 is connected to the member 26 at the periphery of the member 26. It is also provided with an opening 29 in registry with the opening 28 through which the conduit 12 makes a snug sliding fit.

The end cap member 13 comprises a top 31 and a circumambient wall 30, carrying longitudinal dimples 32 spaced apart; four being provided. A reinforcing deflection plate 33 is connected to the wall 30. The conduit 34 fits snugly into the interior of the conduit 12 and carries a flange 35, connected to the wall 30 at the corrugations 32. The cap structure is thus supported by the roof, the member 26 and the canopy 25 being supported by the pivot pins 27. The cap member 30 is also supported by the conduit 12.

A flue gas discharge is thus provided through the space 36, between the flange 35 and the wall 30. Air intake is provided through the opening 26c, and between 26c and 34, and over the upper end of 24 into the conduit 14.

The flue gas discharge is provided from underneath the end cap member 13 through the restricted flue gas vent opening between the dimples 32 (see FIG. 11).

While usual caps for pipes, extending through the roofs, as referred to above, may be used if space is available, the proximity of the flue gas conduit and the air intake, even though spacially separated, introduces limitations on the size and arrangement of the caps. Additionally, special provision may need to be made to support the conduits at the roof line. This is complicated by the pitch of the roof, particularly if it is at all steeply angled.

The cap shown in FIGS. 8–11 permits not only the support of the conduits at the roof line, but also permits of the separation of the ends of the conduits so that the draft is not influenced by the wind, nor does the draft affect the air intake in a substantial way.

The cap will also protect the intake from the weather and from the effect of wind.

Additional advantage is that the cap may be used on flat or pitched roofs.

While I have described particular embodiments of my invention for the purpose of illustration, it should be understood that various modifications and adaptations thereof may be made within the spirit of the invention, as set forth in the appended claims.

I claim:

1. A wall furnace construction for a space to be heated, said space having a roof, said wall furnace comprising a housing, said housing having walls and a top, a combustion space in the lower end of said housing, an air inlet to said combustion space, a combustion vent pipe connected to said combustion space and extending upwardly from said furnace, a duct structure including an air inlet conduit extending upwardly from said furnace and spaced from said vent pipe, an angularly diagonally extending channel air conduit mounted on said wall, said air conduit offset from said air inlet conduit and connected to said air opening and to said air inlet conduit, said connection including a baffle in said duct structure, said baffle diverting the air from said air inlet conduit to said angularly extending conduit.

2. A wall furnace construction for a space to be heated, said space having a roof, said wall furnace comprising a housing, said housing having walls and a top, a combustion space in the lower end of said housing, a combustion gas vent pipe extending upwardly from said furnace, a duct structure including an air inlet conduit extending upwardly from said furnace and spaced from said vent pipe, and an angularly diagonally extending channel mounted on said wall, said channel and said wall defining an air conduit, said air conduit connected to said combustion space and to said air inlet conduit, a baffle in said duct structure diverting the air from said upwardly extending air inlet conduit into said angularly diagonally extending channel.

References Cited by the Examiner

UNITED STATES PATENTS

| | | | |
|---|---|---|---|
| 286,341 | 10/1883 | Spear | 126—56 X |
| 2,764,972 | 10/1956 | Ryder | 126—307 |
| 2,852,017 | 9/1958 | Hamberg et al. | 126—85 |
| 2,856,837 | 10/1958 | Thulman | 98—46 |
| 3,056,397 | 10/1962 | Little | 126—85 |
| 3,082,677 | 3/1963 | Pease | 98—46 |
| 3,171,402 | 3/1965 | Carlson | 126—116 |

JAMES W. WESTHAVER, *Primary Examiner.*